UNITED STATES PATENT OFFICE.

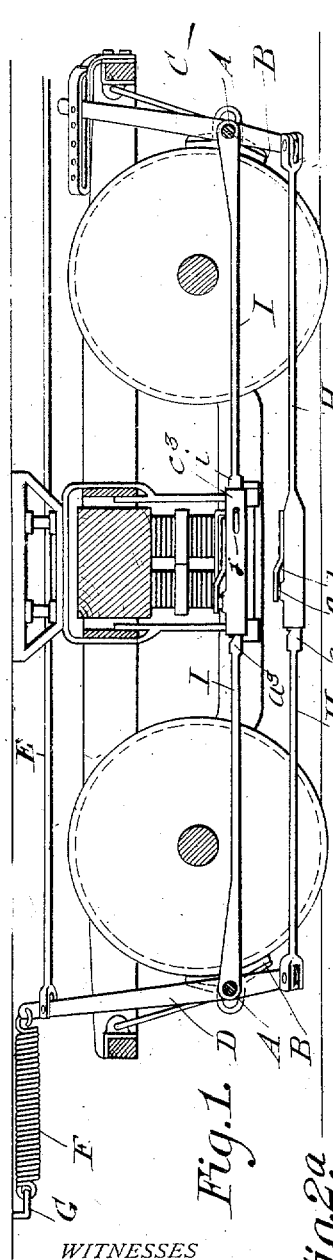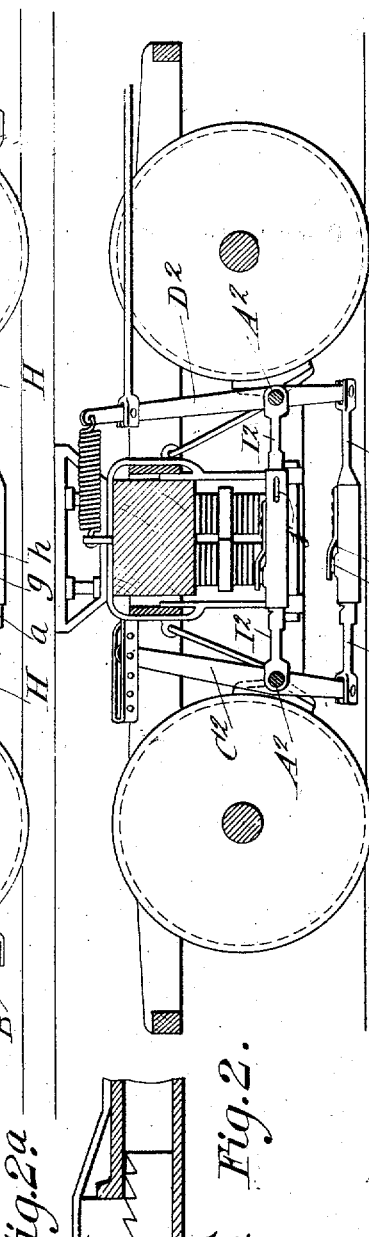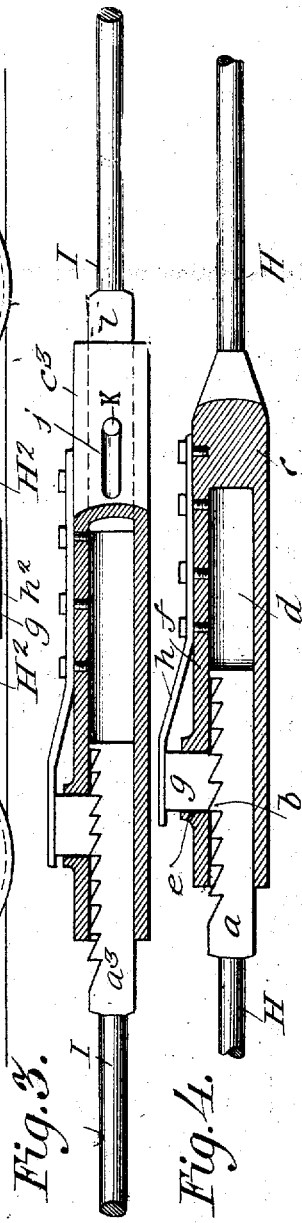

ALVIN RAY DUFFY, OF MANHATTAN, KANSAS.

SLACK-ADJUSTER.

970,026.

Specification of Letters Patent.   Patented Sept. 13, 1910.

Application filed June 2, 1910.   Serial No. 564,674.

*To all whom it may concern:*

Be it known that I, ALVIN RAY DUFFY, a citizen of the United States, residing at Manhattan, in the county of Riley and State of Kansas, have invented new and useful Improvements in Slack-Adjusters, of which the following is a specification.

My invention pertains to railway brakes and particularly to slack adjusters; and it consists in the peculiar and advantageous slack adjuster hereinafter described and definitely claimed.

In the drawings, accompanying and forming part of this specification: Figure 1 is a view illustrative of an "outside" brake equipped with my improvement. Fig. 2 shows an "inside" brake similarly equipped. Fig. 2ª is a detail section illustrating the arrangement of the teeth and pawls of the slack adjuster and retainer in the installment shown in Fig. 2. Fig. 3 is an enlarged detail view of the connection between the rod sections of the retainer for limiting movement of the brake shoes away from the treads of the wheels. Fig. 4 is a similar view of the construction between the rod sections of the slack adjuster.

Referring by letter to the said drawings and more particularly to Figs. 1, 3 and 4 thereof: A A are the brake beams; B B, the brake shoes; C, the dead lever; D, the brake lever, and E, the brake rod of an "outside" brake installation which may be of the conventional construction illustrated or of any other construction consonant with the purposes of my invention without involving departure from the spirit of the same.

In carrying out my invention, a tractile release spring F is connected at one end to the upper portion of the brake lever D and at its opposite end to a suitable support G, and rod sections H are connected at their outer ends to the lower ends of the levers C and D, while rod sections I are connected at their outer ends to the beams A.

As best shown in Fig. 1, one of the rod sections H is provided at its inner end with a portion $a$, of angular form in cross-section, bearing ratchet teeth $b$, and the other rod section H is provided on its inner portion with a housing $c$, having an interior $d$, of angular form in cross-section, to receive the toothed portion $a$, and also having a vertically-disposed aperture $e$ in its upper wall $f$. The said aperture $e$ holds and guides a rectilinearly movable pawl $g$ that is backed by a spring $h$, connected to the top of the housing $c$.

One rod section I of the retainer is provided at its inner end with a toothed portion $a^3$ like the said portion $a$, and the other rod section I is provided at its inner end with a portion $i$, of angular form in cross-section, on which is arranged to slide within certain limits a housing $c^3$. This housing $c^3$ is similar to the before mentioned housing $c$, with the exception that it is provided in opposite walls with longitudinal slots $j$ to receive lateral studs $k$ on the portion $i$, this to permit of the mentioned limited sliding movement of the housing $c^3$ on the angular portion $i$, while preventing turning of the housing about said portion $i$.

If it be assumed in practice that the brake is very slack, it will be understood that in setting up the brake, the rod sections of the retainer, Fig. 3, will be pushed inward or toward each other from the brake beams. Then when the brake is released, the connection shown in Fig. 3 will permit the brake shoes to fall away from the wheels a slight distance, say one inch. Then the tractile spring pulls the brake lever back and also pulls the retainer in the same direction, and, at the same time, pushes the slack adjuster in the opposite direction and takes up the slack, with the result that when the brake is next applied, the shoes hanging about one inch from the wheels and the lever traveling to about center, will give all the power the equipment is capable of affording.

The "inside" construction shown in Figs. 2 and 2ª is similar to that shown in Figs. 1, 3 and 4, with the exception that the dead lever C² and the brake lever D² as well as the brake beams A² are located between the pairs of wheels, and the rod sections H² of the slack adjuster are shorter than the rod sections H, and the rod sections I² of the retainer are shorter than the rod sections I while the teeth of the toothed sections and the pawls are reversed, Fig. 2ª, as compared with the teeth of the rod sections and pawls in the slack adjuster and retainer of Figs. 1, 3 and 4.

It will be gathered from the foregoing that every moving part of my improvement is protected from dust, mud, ice and all other substances likely to impede the free working thereof; also, that all of the parts are well adapted to withstand the shocks and strains to which devices of corresponding character are ordinarily subjected.

While I have shown and described two forms of my invention, it is to be understood that I am not limited to the details or the form or relative arrangement of parts disclosed, but that modifications may be made therein, without departing from the spirit thereof.

Having described my invention, what I claim and desire to secure by Letters-Patent, is:

The combination with brake mechanism; of a slack adjuster extending between and connected to the lower portions of the brake lever and dead lever and comprising a rod section having a portion, of angular form in cross-section, bearing teeth, a second rod section having a housing, interiorly of angular form in cross-section and receiving the toothed portion of the first-named rod section, and also having an aperture in the wall of the housing, a pawl disposed in said aperture, and a spring connected to the housing and backing said pawl; and a retainer extending between and connected with the brake beams and comprising a rod section having a portion, of angular form in cross-section, bearing teeth, a second rod section having a portion of angular form in cross-section and lateral studs thereon, a housing, interiorly of angular form in cross-section, slidably arranged on said angular portion and receiving the toothed portion of the other section and having longitudinal slots receiving said studs and also having an aperture in its wall, a pawl disposed in said aperture, and a spring connected to the housing and backing the pawl.

In testimony whereof I have hereunto set my hand in presence of two subscribing witnesses.

ALVIN RAY DUFFY.

Witnesses:
 ROBT. J. BUCK,
 HENRY OTTO.